United States Patent [19]

Lash et al.

[11] 4,042,451

[45] Aug. 16, 1977

[54] SELECTED STRIPPING OF NICKEL-IRON ALLOYS FROM FERROUS SUBSTRATES

[75] Inventors: Ronald J. Lash, Warren; Edward P. Harbulak, Allen Park, both of Mich.

[73] Assignee: M&T Chemicals Inc., Greenwich, Conn.

[21] Appl. No.: 602,140

[22] Filed: Aug. 5, 1975

[51] Int. Cl.$^2$ .......................... C09K 13/00; C23F 1/00

[52] U.S. Cl. .................................. 156/664; 75/97 A; 75/119; 252/79.1; 156/656

[58] Field of Search ...................... 156/18, 7, 656, 664; 252/79.1, 79.4; 75/97 A, 119; 134/29, 2; 204/34, 47, 48, 146

[56] References Cited

U.S. PATENT DOCUMENTS

| | | | |
|---|---|---|---|
| 2,200,486 | 5/1940 | Burdick | 75/97 A |
| 2,698,781 | 1/1955 | Meyer | 252/79.4 |
| 2,937,940 | 5/1960 | Weisberg | 134/29 |
| 3,460,938 | 8/1969 | Grunwald | 252/79.4 |
| 3,583,867 | 6/1971 | Slominski et al. | 75/119 |
| 3,669,776 | 6/1972 | Eppensteiner | 252/79.1 |
| 3,717,520 | 2/1973 | Brinoisi | 252/79.4 |
| 3,804,726 | 4/1974 | Passal | 204/48 |
| 3,849,218 | 11/1974 | Beckwith et al. | 156/18 |
| 3,856,694 | 12/1974 | Becking | 156/18 |

*Primary Examiner*—Charles E. Van Horn
*Assistant Examiner*—Jerome W. Massie
*Attorney, Agent, or Firm*—Kenneth G. Wheeless; Robert P. Auber; Robert Spector

[57] ABSTRACT

A composition and process for selectively removing nickel and nickel alloys with iron and/or cobalt from a surface of a metal substrate which comprises contacting said metal surface with an aqueous bath containing:

a. at least one nitro substituted organic compound:
b. at least one organic amine or polyamine or substituted amine or polyamine; and
c. at least one phosphorus oxo acid or organic phosphorus oxo acid or salts thereof or alkyl phosphonate substituted amines.

By nickel-iron alloy deposit is meant a deposit containing from about 5 to 90 percent by weight iron with that portion which is not iron being primarily nickel or nickel and cobalt. Although small amounts of impurities such as copper, zinc, cadmium, lead, etc. may also be present, the major constituents of the alloy are nickel and iron.

19 Claims, No Drawings

SELECTED STRIPPING OF NICKEL-IRON ALLOYS FROM FERROUS SUBSTRATES

SELECTED STRIPPING OF METALS

This invention relates to compositions and methods for stripping nickel, nickel-iron alloys and nickel-iron-cobalt alloys from metal substrates, particularly from steel substrates.

BRIEF DESCRIPTION

This invention is a composition and process for selectively removing nickel, nickel-iron alloys and nickel-iron-cobalt alloys from a surface of a metal substrate which comprises contacting said metal surface with an aqueous bath containing:

a. at least one nitro substituted organic compound;
b. at least one organic amine or polyamine or substituted amine or polyamine; and
c. at least one phosphorus oxo acid or organic phosphorus oxo acid or salts thereof or alkyl phosphonate substituted amines.

By nickel-iron alloy deposit is meant a deposit containing from about 5 to 90 percent by weight iron with that portion which is not iron being primarily nickel or nickel and cobalt. Although small amounts of impurities such as copper, zinc, cadmium, lead, etc. may also be present, the major constituents of the alloy are nickel and iron.

BACKGROUND OF THE INVENTION

A number of methods for removing nickel deposits appear in the technical patent literature. However, these methods have not been commercially successful in removing the nickel-iron electrodeposits as for example mentioned in U.S. Pat. Nos. 3,795,591 and 3,806,429 to Clauss et al or U.S. Pat. No. 3,804,726 to Passal. It has heretofore been possible to strip nickel deposits (electrolytic or electroless) from a basis metal such as steel or iron because the nickel deposit is sufficiently different chemically and or electrochemically from the basis metal. The stripping action is confied to the nickel deposit and does not attack the basis metal. However with nickel-iron alloy deposits, particularly those with substantial proportions of iron (e.g. 15% or more), the deposit is very similar chemically to a ferrous base on which the nickel-iron alloy is electroplated. It is therefore an object of this invention to provide a combination of constituents, which together create a stripping solution for use in the reclamation of nickel plated objects, and especially nickel-iron or nickel-iron-cobalt plated objects, which is selective in the removal of these deposits while leaving the basis metal unaffected.

DETAILED DESCRIPTION

This invention is a composition and process for selectively removing nickel, nickel-iron alloys and nickel-iron-cobalt alloys from a surface of a metal substrate which comprises contacting said metal surface with an aqueous bath containing:

a. at least one nitro substituted organic compound containing at least one solubilizing group;
b. at least one organic amine or polyamine or substituted amine or polyamine; and
c. at least one phosphorus oxo acid or organic phosphorus oxo acid or salts thereof or alkyl phosphonate substituted amines.

By nickel-iron alloy deposit is meant a deposit containing from about 5 to 90 percent by weight iron with that portion which is not iron being primarily nickel or nickel and cobalt. Although small amounts of impurities such as copper, zinc, cadmium, lead, etc. may also be present, the major constituents of the alloy are nickel and iron.

Typical nitro substituted organic compounds are mono or poly nitro substituted benzene rings containing one or more solubilizing groups such as carboxylic or sulfonic acids, etc., for example:

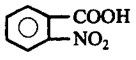
o-nitrobenzoic acid

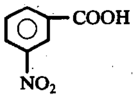
m-nitrobenzoic acid

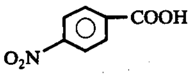
p-nitrobenzoic acid

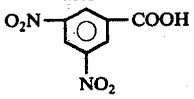
3,5-dinitrobenzoic acid

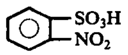
o-nitrobenzene sulfonic acid

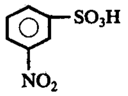
m-nitrobenzene sulfonic acid

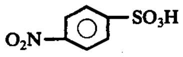
p-nitrobenzene sulfonic acid

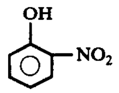
o-nitrophenol

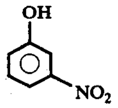
m-nitrophenol

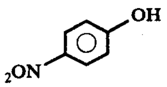
p-nitrophenol or

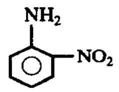
o-nitroaniline

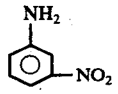
m-nitroaniline

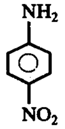
p-nitroaniline

It is understood that salt of the above acids may be used instead of the free acid, for example, $Na+$, $K+$, $Li+$, $NH_4+$, etc.

Of the above compounds, para- and meta-nitrobenzoic acid are particularly advantageous because of their efficacy and ready commercial availability.

Typical operable organic amines or polyamines or substituted amines or polyamines are exemplified by the following list:

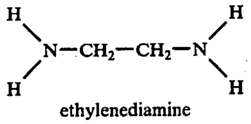
ethylenediamine

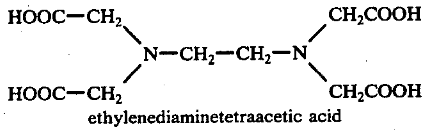
ethylenediaminetetraacetic acid

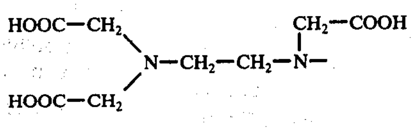

-continued

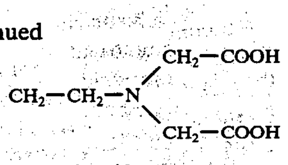

diethylenetriaminepentaacetic acid

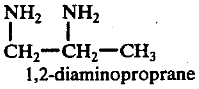

1,2-diaminoproprane

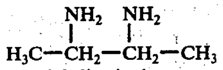

2,3-diaminobutane $H_2N-(CH_2)_3-NH_2$ 1,3-diaminopropane

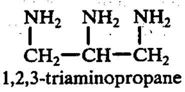

1,2,3-triaminopropane

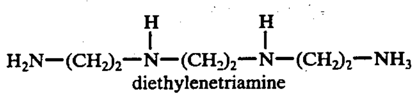

diethylenetriamine

It is understood that salts of the above acids or quaternized derivatives of the amine groups may be used instead of the free acid or amine.

The operable phosphorus oxo anions as their acids or salts are the phosphates, condensed phosphates such as pyrophosphate and other polyphosphates, as well as the organic phosphates, phosphonates, phosphinates and alkyl phosphonate substituted amines. Typical example of suitable phosphorus oxo anions include:

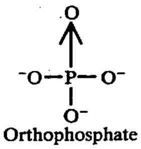

Orthophosphate

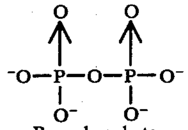

Pyrophosphate (dipolyphosphate)

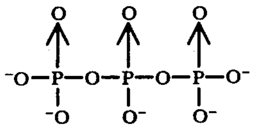

Tripolyphosphate

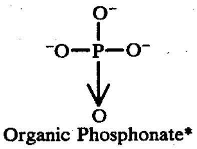

Organic Phosphonate*

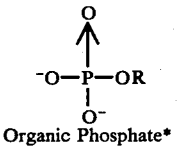

Organic Phosphate*

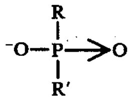

Organic Phosphinate**

*Where R is aryl or substituted aryl or straight or branched chain alkyl with up to eight carbon atoms.

**Where R and R' are independently selected from aryl or substituted aryl or straight or branched chain alkyl with up to eight carbon atoms.

The following is a structural representation of an alkyl phosphonate substituted amine:

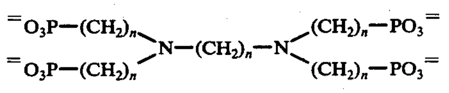

where each *n* is separately an integer of from 1 to 4. It is understood that suitable cations are required along with the above anions to provide charge neutrality. For example, hydrogen, sodium, potassium, lithium, ammonium, etc.

Of the above typical phosphorus oxo compounds, ortho phosphoric acid or its various salts and pyrophosphoric acid or its various salts are especially useful in the operation of this invention.

A combination of at least one compound selected from each of the following groups, a, b, and c, will effectively remove a nickel-iron alloy deposit from a ferrous object, without etching, dissolving or attacking said ferrous object.

In order to strip or remove nickel, nickel-iron or nickel-iron-cobalt alloy deposit containing up to about 90% iron from a ferrous basis metal according to the various aspects of this invention, it is necessary to prepare an aqueous solution, selecting at least one ingredient from each of the following classes of materials:

a. a nitro substituted organic compound further characterized in that it contains at least one solubilizing group;
b. an organic amine, polyamine or substituted amine or polyamine; and
c. a phosphorus oxo acid or salts thereof or organic phosphorus oxo acid or salts thereof, or an alkyl phosphonate substituted amine.

The purpose of the nitro substituted organic compounds or group (a) (a good example being para-nitrobenzoic acid) is to oxidize the nickel-iron alloy deposit. Suitable concentration ranges for the organic nitro compounds may be from about 0.015 – 2.2 moles/1, preferably about 0.06 – 1.5 moles/1 and most preferred about 0.1 to 0.8 moles/1.

The organic amine or polyamines of group (b) function as complexing agents for the nickel ions, provide a buffering action to stabilize the pH of the solution and, most importantly, are active in preventing etching of a ferrous basis metal which otherwise might be attacked by the organic nitro compounds. Operable concentration ranges for the organic amines or polyamines are from 0.015 to 7 moles/1, preferably about 0.03 to 5 moles/1 and most preferred 0.05 to 4 moles/1.

The phosphorus oxo acids or salts thereof of group (c) are believed to function as complexing agents for the oxidized metals of the deposit and thus to help solubilize the nickel and iron and/or cobalt ions and assist in their removal from the surface of the deposit so that the organic nitro oxidizing agents can function efficiently. Suitable concentration ranges for the phosphorus oxo acids or salts thereof may be from about 0.05 moles/1 to saturation, preferably about 0.1 to 5 moles/1 and most preferred about 0.3 to 2 moles/1.

Since the chemical reaction proceeds more rapidly at higher temperatures, it is advantageous to operate the nickel-iron stripping solutions of this invention at elevated temperatures. In addition, when using the various ingredients at the higher concentration ranges, limited solubility may require operation at above room temperatures. Suitable temperatures may range from about 30° C to boiling. Boiling solutions, however, evaporate rapidly thus necessitating frequent additions of water as well as posing other problems; therefore, a range of 60° C to 90° C provides a useful compromise which gives an efficient rate of stripping without excessive loss of solution or other attendant problems of boiling solutions.

The pH of the solution must be considered in the efficient operation of this invention. The pH should neither be so low as to cause etching of the basis metal nor so high as to cause reduced solubility of the components. The effective pH depends on the type of compounds chosen from the classes a, b and c but is in the range of 6 to 14. A desirable operating range is between pH 9 to 13 with a preferred pH of about 10 to 12. The pH may be adjusted by appropriate additions of acids and bases. For example, phosphoric, sulfuric or hydrochloric acid and sodium or ammonium hydroxide may be conveniently used to lower or raise the operating pH of the stripping solution. It is also advantageous to measure the pH of the solution at the operating temperature.

Although this invention has been described in terms of stripping a nickel-iron deposit from a ferrous basis metal, it will be readily apparent to those skilled in the art that brass or copper or other copper alloys can also serve as a suitable basis metal for nickel, nickel-iron alloy or nickel-iron-cobalt alloy deposits. Since these metals may be readily etched by the action of the stripping solutions described herein, it is advantageous to additionally include inhibitors to the formulations of this invention. These inhibitors are most suitably sulfur compounds of the type listed in U.S. Pat. No. 3,102,808. Typical examples are diethyldithiocarbamate, thiourea, sodium sulfide, etc.

The following examples will further serve to illustrate the operation of this invention to those skilled in the art. However, these examples are not meant to limit the scope of the invention.

EXAMPLE 1

A nickel stripper was prepared having the following composition in water:

meta-nitrobenzoic acid: 0.5 mol/l
ethylenediamine: 2.9 mol/l

It is known in the art (U.S. Pat. No. 2,937,940) that a solution with the above formulation is effective in stripping electrodeposited nickel from basis metals. A steel panel, previously plated with a bright nickel-iron alloy electrodeposit to an average thickness of 8 microns and containing 48.9% iron, was immersed in the above solution which was maintained at a temperature of 80° C. After 2 hours, the deposit was discolored but no evidence of stripping was observed.

EXAMPLE 2

A nickel-iron stripper was prepared having the following composition in water:

meta-nitrobenzoic acid: 0.5 mol/l
ethylenediamine: 2.9 mol/l
potassium orthophosphate (dibasic): 1.2 mol/l a nickel-iron alloy electrodeposit containing about 50% iron plated to an average thickness of 8 microns directly on steel was immersed at 80° C in this solution for 90 minutes. At the end of this time the nickel-iron deposit had been stripped from the basis steel leaving a clean, etch-free surface.

EXAMPLE 3

A nickel-iron stripper was prepared having the following composition in water:

meta-nitrobenzoic acid: 0.5 mol/l
ethylenediamine: 2.9 mol/l
potassium pyrophosphate: 0.39 mol/l
phosphoric acid: to pH 11

A nickel-iron alloy electrodeposit containing about 50% iron plated to an average thickness of 8 microns directly on steel was immersed in the solution at 80° C for 20 minutes. At the end of this time the nickle-iron deposit was completely removed from the basis steel leaving a clean, etch-free surface.

EXAMPLE 4

A nickel-iron stripper was prepared having the following composition in water:

meta-nitrobenzoic acid: 0.25 mol/l
ethylenediamine: 1.5 mol/l
sodium tripolyphosphate: 0.5 mol/l
phosphoric acid: to pH 11.

A nickel-iron electrodeposit containing about 50% iron plated to a thickness of 8 microns directly on steel was immersed in the solution at 80° C for 75 minutes. At the end of this time the deposit was completely stripped from the basis steel leaving an etch-free surface. Parts of the steel were left with a transparent brown stain which was removed when immersed in a pickling solution of 10% sulfuric acid for a few seconds.

EXAMPLE 5

A nickel-iron stripper was prepared having the following composition in water:

para-nitrobenzoic acid: 0.25 mol/l
ethylenediamine: 1.5 mol/l
potassium pyrophosphate: 0.19 mol/l.
pH 10.5 as prepared A nickel-iron alloy electrodeposit containing about 42% iron plated to an average thickness of 8 microns directly on steel was immersed in the solution at 80° C for 60 minutes. At the end of this time the deposit was completely stripped from the basis steel leaving a clean, etch-free surface.

EXAMPLE 6

A nickel stripper whose composition is formulated in accordance with Example 5 but with the meta isomer of nitrobenzoic acid being substituted in place of the para isomer was prepared. A nickel-iron electrodeposit containing about 42% iron plated to a thickness of 8 microns directly on steel was immersed in the solution at 80° C for 35 minutes. At the end of this time the deposit was completely stripped from the basis steel leaving a clean, etch-free surface.

EXAMPLE 7

A nickel-iron stripper was prepared having the following composition in water:

para-nitrobenzoic acid: 0.5 mol/l
ethylenediamine: 2.9 mol/l
potassium pyrophosphate: 0.39 mol/l
phosphoric acid: to pH 11.6 (elect.).

A nickel-iron electrodeposit containing about 29% iron plated to a thickness of 8 microns directly on steel was immersed in the solution at 80° C for 45 minutes. At the end of this time the deposit was completely stripped from the basis steel leaving a clean, etch-free surface.

EXAMPLE 8

A nickel or nickel-iron stripper was prepared having the following composition in water:

meta-nitrobenzenesulfonic: 0.09 mol/l
acid sodium salt:
ethylendiamine: 1.5 mol/l
potassium orthophosphate (dibasic): 0.3 mol/l pH 11.4 as prepared:

A nickel-iron alloy electrodeposit containing 29% iron, plated to a thickness of 8 microns directly on steel was immersed in the solution at 80° C for 75 minutes. At the end of this time the deposit was about 90% stripped from the basis steel leaving a clean, etch-free surface.

EXAMPLE 9

A stripping solution was formulated in accordance with Example 7. A bright nickel electrodeposit plated to a thickness of about 10 microns directly on steel was immersed in the solution at 80° C for 60 minutes. At the end of this time the deposit was completely stripped from the basis steel leaving a clean etch-free surface.

EXAMPLE 10

A nickel or nickel-iron stripper was prepared having the following composition in water:

meta-nitrobenzoic acid: 0.18 mol/l
ethylendiamine: 1.1 mol/l
ethylenediamine tetra (methylene phosphonic acid) sodium salt: 0.08 mol/l
pH: 10.5 as prepared.

A nickel-iron alloy electrodeposit containing 38% iron, plated to a thickness of 8 microns directly on steel was immersed in the solution at 80° C for 30 minutes. At the end of this time, the deposit was completely stripped from the basis steel leaving a clean, etch-free surface.

Although this invention has been described with reference to specific examples, it will be apparent that various modifications may be made thereto which fall within the scope of this invention.

We claim:

1. A process for selectively removing nickel-iron alloys or nickel-iron-cobalt alloys, said alloys containing from 5 percent to 90 percent iron, from the surface of a ferrous metal substrate which comprises contacting iron alloys with an aqueous alkaline bath containing:
   a. at least one nitro substituted organic compound containing at least one solubilizing group;
   b. at least one organic amine or polyamine or substituted amine or polyamine; and
   c. at least one phosphorus oxo acid or organic phosphorus oxo acid or salts thereof or alkyl phosphonate substituted amines.

2. The process of claim 1 wherein said nitro substituted organic compound is a nitrobenzoic acid.

3. The process of claim 1 wherein said nitro substituted organic compound is a nitrobenzene sulfonic acid.

4. The process of claim 1 wherein said nitro substituted organic compound is a nitrophenol.

5. The process of claim 1 wherein said nitro substituted organic compound is a nitroaniline.

6. The process of claim 1 wherein said organic amine is ethylene diamine.

7. The process of claim 1 wherein said organic amine is ethylenediaminetetraacetic acid.

8. The process of claim 1 wherein said organic amine is diethylenetriaminepentaacetic acid.

9. The process of claim 1 wherein said organic amine is 1,2-diaminopropane.

10. The process of claim 1 wherein said organic amine is 2,3-diaminobutane.

11. The process of claim 1 wherein said organic amine is 1,3-diaminopropane.

12. The process of claim 1 wherein said organic amine is 1,2,3-triaminopropane.

13. The process of claim 1 wherein said organic amine is diethylenetriamine.

14. The process of claim 1 wherein said phosphorus oxo moiety exhibits an orthophosphate anion.

15. The process of claim 1 wherein said phosphorus oxo moiety exhibits a pyrophosphate anion.

16. The process of claim 1 wherein said phosphorus oxo moiety exhibits a tripolyphosphate anion.

17. The process of claim 1 wherein said phosphorus oxo moiety exhibits a formula

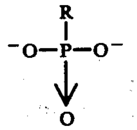

where R is selected from the group consisting of aryl, substituted aryl, and straight or branched alkyl of fewer than nine carbon atoms.

18. The process of claim 1 wherein said phosphorus oxo moiety exhibits the formula:

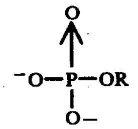

wherein R is selected from the group consisting of aryl, substituted aryl, and straight or branched chain alkyl of fewer than nine carbon atoms.

19. The process of claim 1 wherein said phosphorus oxo moiety exhibits the formula:

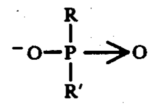

wherein R and R' are each independently selected from the group consisting of aryl, substituted aryl, and straight or branched chain alkyl of fewer than nine carbon atoms.

* * * * *